US009646448B2

(12) United States Patent
Eichenberger et al.

(10) Patent No.: US 9,646,448 B2

(45) Date of Patent: May 9, 2017

(54) SECURITY DOCUMENT WITH MICROPERFORATIONS

(71) Applicant: Orell Füssli Sicherheitsdruck AG, Zürich (CH)

(72) Inventors: Martin Eichenberger, Zollikon (CH); Dieter Sauter, Dietikon (CH)

(73) Assignee: ORELL FUSSLI SICHERHEITSDRUCK AG, Zurich (CH)

( * ) Notice: Subject to any disclaimer, the term of this patent is extended or adjusted under 35 U.S.C. 154(b) by 0 days.

(21) Appl. No.: 14/430,044

(22) PCT Filed: Sep. 21, 2012

(86) PCT No.: PCT/CH2012/000218

§ 371 (c)(1),
(2) Date: Mar. 20, 2015

(87) PCT Pub. No.: WO2014/043820

PCT Pub. Date: Mar. 27, 2014

(65) Prior Publication Data

US 2015/0228143 A1 Aug. 13, 2015

(51) Int. Cl.

*G06K 9/00* (2006.01)
*G07D 7/20* (2016.01)

(Continued)

(52) U.S. Cl.

CPC ......... *G07D 7/2058* (2013.01); *G06K 9/3208* (2013.01); *G07D 7/0053* (2013.01); *G07D 7/12* (2013.01)

(58) Field of Classification Search

None

See application file for complete search history.

(56) References Cited

U.S. PATENT DOCUMENTS 3,818,190 A * 6/1974 Silverman ................ G06K 5/00 235/382
6,348,958 B1 * 2/2002 Matsuoka ......... G02F 1/133514 349/106

(Continued)

FOREIGN PATENT DOCUMENTS

DE 103 15 558 A1 10/2004
JP EP 1102217 A2 * 5/2001 ............... G07D 7/20

(Continued)

OTHER PUBLICATIONS

English Abstract of DE 103 15 558 A1.

(Continued)

*Primary Examiner* — Soo Park

(74) *Attorney, Agent, or Firm* — Ladas & Parry LLP

(57) ABSTRACT

A method for verifying the authenticity of a security document by means of a camera-equipped cellphone comprises steps of acquiring a transmission mode image and a reflection mode image of the security document. Transmitted light through a plurality of perforations in a substrate of the security document is evaluated by means of the cellphone. Then, a relative positioning of the perforations with respect to a printed security features is determined, and the security document is considered "authentic" if the determined positions and the acquired images substantially correspond to pre-stored "templates" for the security document. The perforations are structured such that they are not visible to the naked eye of a human observer which makes it harder to counterfeit the security document.

23 Claims, 5 Drawing Sheets

(51) Int. Cl.

| | |
|---|---|
| ***G07D 7/12*** | (2016.01) |
| ***G06K 9/32*** | (2006.01) |
| ***G07D 7/00*** | (2016.01) |

(56) References Cited

U.S. PATENT DOCUMENTS

| | | | | | |
|---|---|---|---|---|---|
| 8,840,756 | B2 * | 9/2014 | Doublet | D21F 11/006 | 162/141 |
| 8,893,973 | B2 * | 11/2014 | Shaffer | G07D 7/00 | 235/435 |
| 8,991,706 | B2 * | 3/2015 | Green | G07D 7/0006 | 235/435 |
| 9,013,272 | B2 * | 4/2015 | Kaminska | B42D 25/29 | 235/494 |
| 9,501,697 | B2 * | 11/2016 | Rosset | G06K 9/00496 | |
| 2003/0161017 | A1 * | 8/2003 | Hudson | G03H 1/18 | 359/2 |
| 2006/0006236 | A1 * | 1/2006 | Von Fellenberg | G07D 7/0006 | 235/458 |
| 2007/0170265 | A1 * | 7/2007 | Sinclair | G06K 19/086 | 235/491 |
| 2008/0174104 | A1 * | 7/2008 | Ukpabi | B42D 25/29 | 283/93 |
| 2012/0176652 | A1 * | 7/2012 | Green | B41M 3/148 | 358/3.28 |
| 2013/0043311 | A1 * | 2/2013 | Green | G07D 7/0006 | 235/458 |
| 2013/0300101 | A1 * | 11/2013 | Wicker | G07D 7/0093 | 283/67 |

FOREIGN PATENT DOCUMENTS

| | | | |
|---|---|---|---|
| WO | 97/18092 | A1 | 5/1997 |
| WO | 2004/011274 | A1 | 2/2004 |
| WO | 2008/110787 | A1 | 9/2008 |
| WO | 2011/098803 | A1 | 8/2011 |
| WO | 2012/046213 | A1 | 4/2012 |

OTHER PUBLICATIONS

Suzuki, S., et al., "Topological Structural Analysis of Digitized Binary Images by Border Following", Computer Vision, Graphics, and Image Processing, 30, 1985, pp. 32-46.

Lowe, D. G., "Distinctive Image Features from Scale-Invariant Keypoints", International Journal of Computer Vision 60 (2), 2004, pp. 91-110.

Ramer-Douglas-Peucker algorithm, Wikipedia, Sep. 1, 2016, pp. 1-3.

Bronstein, et al., "Taschenbuch der Mathematik", 4th edition, 1999, 2 pages.

* cited by examiner

SECURITY DOCUMENT WITH MICROPERFORATIONS

CROSS-REFERENCE TO RELATED APPLICATION

This U.S. application claims priority under 35 U.S.C 371 to, is a U.S. National Phase application of, the International Patent Application No. PCT/CH2012/000218, filed 21 Sep. 2013. The entire content of the above-mentioned patent application is incorporated by reference as part of the disclosure of this U.S. application.

TECHNICAL FIELD

The invention relates to a method for verifying the authenticity of a security document and to a verification device implementing such a method.

INTRODUCTION AND BACKGROUND ART

It is known that security documents such as a bill, an ID card, a deed, a certificate, a check, or a credit card can comprise a perforation.

WO 97/18092, WO 2004/011274, and WO 2008/110787 A1 disclose such security documents.

However, a verification of the authenticity of such a security document is not practicable and/or secure in all situations.

DISCLOSURE OF THE INVENTION

Therefore, it is an object of the invention to provide an easier to apply and/or more secure method for verifying the authenticity of a security document. Another object of the invention is to provide a verification device implementing such a method.

These objects are achieved by the devices and methods of the independent claims.

Accordingly, a method for verifying an authenticity of a security document comprises a step of acquiring a transmission mode image of at least a part of a perforation pattern of the security document. The at least one perforation pattern comprises a plurality of perforations of a least a part of a substrate, in particular of a flat substrate, of the security document. The step of acquiring the transmission mode image is achieved by means of a verification device, e.g., comprising an image acquisition device such as a camera. Such a verification device is advantageously selected from a group consisting of a camera-equipped cellular phone, a camera-equipped tablet computer, a digital camera, a camera-equipped laptop computer, a bank note sorter (as, e.g., used in bank note production), and a bank note acceptor (as, e.g., used in ATMs).

The term "transmission mode image" herein relates to an image that is taken in a transmission setup, i.e., with a light source (e.g., light from a ceiling lamp or from the sun or from a light source which is part of the verification device) located on a first side of the substrate of the security document and with the verification device during the acquisition of the transmission mode image located on an opposing second side of the substrate. In other words, while the verification device acquires an image facing a second surface on the second side of the security document, the light source illuminates the opposing first surface on the first side of the security document. In a transmission setup, an amount of light illuminating the first surface is higher than an amount of light illuminating the second surface. Thus, among others, the amount of light that is transmitted through the substrate of the security document and in particular through the perforations/perforation pattern(s) in said substrate can be recorded in a spatially resolved manner. As an example, more light is typically transmitted through perforated regions of the substrate than through unperforated regions. Then, the perforated regions of the substrate can appear as brighter spots in a transmission mode image.

It should be noted here, that the perforations can but do not necessarily extend through the whole substrate (and/or other layers such as printed security features, see below) of the security document but only through one or more layers of an, e.g., multi-layered substrate. Typically, these layers of the substrate extend perpendicular to the surfaces of the flat substrate. It is also possible to only partly perforate a single-layer substrate or a single layer of a multi-layer substrate e.g., by utilizing tightly focused short-pulsed laser irradiation and associated nonlinear light absorption phenomena. The perforations are typically but not necessarily oriented in an axial (i.e., normal) direction of the security document, i.e., perpendicular to the surfaces of the substrate of the security document. However, also a skewed orientation of the perforations is possible, i.e., with perforation-axes being non-perpendicular to a surface of the substrate.

Then, the authenticity of the security document is verified by means of the verification device using said acquired transmission mode image. This is, e.g., achieved by comparing the spatially resolved light intensities in the acquired transmission mode image to a prestored and/or expected light distribution template for an "authentic" security document.

The perforations of the perforation pattern of the substrate of the security document may or may not be visible to the naked eye of a human observer (i.e., a human observer with average visual acuity without utilizing further optical auxiliary means such as a magnifying glass) in the above described transmission mode. In a reflection mode, however, at least one of the perforations is not visible to the naked eye of such a human observer.

Herein, the term "reflection mode image" relates to an image taken with a reflection setup in which no backlighting illuminating the first surface of the substrate is present. In other words, the amount of light illuminating the second surface (i.e., the surface facing the verification device) is not outshined by an amount of light illuminating the first surface of the substrate.

As an advantage, the disclosed method provides a more secure way to verify the authenticity of the security document because not all perforations are obvious to a potential counterfeiter of the security document.

In an advantageous embodiment, at least one of the perforations of the substrate of the security document has a lateral dimension less than 200 microns, in particular less than 150 microns, particularly less than 100 microns. Such perforations can, e.g., be manufactured using laser irradiation of the substrate as a is step during the manufacturing process of the security document. The above-mentioned lateral dimension is measured in at least one direction parallel to a surface of the substrate. Thus, it is easier to provide perforations that are not visible to the naked eye of a human observer in reflection mode.

The perforations can advantageously have different shapes and/or different lateral dimensions parallel to a surface of the substrate (i.e., in-surface-plane) and/or different axial dimensions perpendicular to a surface of the substrate (i.e., out-of-surface-plane). Thus, a plurality of different perforations can be combined which makes it harder to counterfeit the security document and which can make the authenticity verification process more reliable and/or secure.

In a different embodiment, all perforations have substantially (i.e., with deviations less than 10%) the same shapes and the same lateral dimensions parallel to a surface of the substrate and the same axial dimensions perpendicular to a surface of the substrate. Thus, a single master perforation can be used multiple times which simplifies the manufacturing process of the perforations/perforation pattern.

In another embodiment, the security document comprises at least

- a first perforation pattern comprising a plurality of perforations of at least a part of said substrate and
- a second perforation pattern comprising a plurality of perforations of at least a part of said substrate.

The second perforation pattern is translated and/or rotated and/or mirrored and/or scaled with respect to said first perforation pattern. Thus, the at least two perforation patterns are "similar" to each other in a way that a linear transformation "translation", "rotation", "mirroring", and/or "scaling" is applied to the first perforation pattern to yield the second perforation pattern. As an effect, certain features of the perforation pattern (e.g., angles between lines connecting perforated dots) are maintained and encoded multiple times in the perforation patterns of the security document. Thus, the step of verifying the authenticity of the security document can be simplified because, e.g., only a relevant part of one perforation pattern needs to be evaluated from the acquired transmission image.

In another advantageous embodiment of the method, the step of acquiring the transmission mode image is carried out at a non-zero tilt angle between an optical axis of the verification device (i.e., the perpendicular axis to an image sensor of the verification device) and a third axis perpendicular to a surface of the substrate of the security document (i.e., the surface normal). In other words, the image sensor plane in the verification device and the substrate plane of the security document are not parallel to each other, but rotated with respect to each other by said tilt-angle. The tilt-angle is advantageously greater than 10 degrees, in particular greater than 30 degrees, particularly greater than 45 degrees. Furthermore, in this embodiment, a first lateral dimension (i.e., a dimension along a surface of the substrate) along a first axis of at least one of said perforations is different from a second lateral dimension along a second axis of said at least one of said perforations. The first axis and the second axis are both parallel to a surface of the substrate of the security document. By combining a substrate perforation with two different lateral dimensions with a tilted transmission image acquisition, a tilt-angle dependent transmitted light n distribution can be created and read out. This enhances the security of the authenticity verification of the security document.

As an example for this, at least a part of a perforation can have a line shape, e.g., along the second dimension, i.e., the (larger) second dimension (i.e., the line length) of the line-shaped perforation is at least 2 times, in particular at least 5 times, particularly at least 10 times the first dimension (i.e., the line width) of the line-shaped perforation.

Even more advantageously, in such an embodiment, the optical axis of the verification device substantially (i.e., with a deviation of less than ±10 degrees) lies in a plane which is defined by the first axis and the third axis or the optical axis lies substantially in a plane defined by the second axis and the third axis. Thus, more specific transmitted light patterns can be acquired which enhances the security of the authenticity verification of the security document.

Even more advantageously, in such an embodiment, the step of acquiring the transmission mode image (i.e., a first transmission mode image) is carried out at a first tilt angle and a further step of acquiring an additional transmission mode image (i.e., a second transmission mode image) is carried out at a second tilt angle different from the first tilt angle. Then, the (first) transmission mode image and the additional (second) transmission mode image are used in said step of verifying said authenticity of said security document. Thus, the security of the authenticity verification of the security document is enhanced.

Even more preferably, the perforation is at least in part line-shaped and has a first dimension less than 200 μm and a second dimension greater than 400 μm. Then, a first transmission mode image with a line-shaped transmitted light intensity is acquired in transmission mode with the optical axis of the verification device substantially lying in the plane defined by the second axis and the third axis. In the second additional transmission mode image, no transmitted light pattern is acquired with the optical axis of the verification device substantially lying in the plane defined by the first axis and the third axis. Thus, very specific light patterns can be created by tilting the security document with respect to the verification device in a defined way. This enhances the security of the authenticity verification of the security document.

In another preferred embodiment, the perforation pattern is self-similar, i.e., the perforation pattern is similar to a part of itself (in a geometrical sense, see, e.g., Bronstein et al., "Taschenbuch der Mathematik", $4^{th}$ edition, 1999). Thus, more specific light patterns in transmission mode images can be created which enhances the security of the authenticity verification of the security document.

In another advantageous embodiment the method comprises a further step of acquiring a reflection mode image (see definition above) of at least a part of the perforation pattern of the security document by means of the verification device. Then, both the transmission mode image and the reflection mode image are used in the step of verifying the authenticity of the security document. This has the advantage that features of the security document that are evaluated in transmission mode and in reflection mode can be used for authenticity verification. Thus, the security of the authenticity verification of the security document is enhanced.

Even more advantageously, the step of acquiring the reflection mode image comprises a change of an illumination of the security document, in particular by means of a firing of a flash of said verification device. Due to a more defined illumination of features of the security document such as perforations/perforation patterns and/or printed security features of the security document, the features can be more easily evaluated and the step of verifying the authenticity of the security document becomes more reliable.

In another preferred embodiment of the method, at least one of the group consisting of

- a shape of at least one of said perforations,
- a lateral dimension parallel to a surface of said substrate of at least one of said perforations,
- a transmitted light intensity and/or wavelength through at least one of said perforations,
- a number of perforations,
- a positioning of at least one of said perforations, and
- an angle between two connecting lines between three perforations is or are used in the step of verifying the authenticity of the security document. The positioning of said at least one of said perforations can be evaluated in an absolute (i.e., with respect to a fixed feature of the security document, e.g., with respect to an edge or a corner of the substrate) and/or in a relative (i.e. with respect to another perforation) manner. Connecting lines between three or more perforations can be perforated lines or imaginary lines, i.e., imagined shortest connections between the, e.g., centers of the respective perforations.

By evaluating and utilizing one or more of the above features, the reliability and security of the authenticity verification step is enhanced. It should be noted that features of (e.g., connecting lines between) perforations belonging to different perforation patterns and/or features of perforations not belonging to a perforation pattern can be evaluated.

In another advantageous embodiment, the security document additionally comprises at least one perforation which is not used in the step of verifying the authenticity of the security document. This has the advantage that it remains unknown to a potential counterfeiter which features of which perforations are used for verifying the authenticity of the security document. Thus, the security document becomes harder to counterfeit and the authenticity verification process becomes more secure.

In another preferred embodiment, the security document further comprises an additional security feature (in particular a printed security feature, a metal filament, or a hologram), on said substrate. The authenticity verification method comprises a step of acquiring a reflection mode image and/or a transmission mode image of the additional security feature on the substrate of said security document. This is achieved by means of the verification device. Then, the transmission mode image of at least said part of said perforation pattern and said reflection mode image and/or said transmission mode image of said additional security feature are used in said step of verifying the authenticity of the security document. The transmission mode image of the perforation pattern and of the additional security feature can be the same image. As a consequence, because an image of the additional security feature is also used in the step of verifying the authenticity of the security document, the security document becomes harder to counterfeit and the authenticity verification process becomes more reliable.

More advantageously, the authenticity verification method comprises a further step of determining a relative positioning of at least one of the perforations with respect to the additional security feature. Then, this determined positioning, e.g., a distance and/or a bearing angle, is used in said step of verifying the authenticity of the security document. As an example, a distance of a specific perforation from the additional security feature can be determined and the security document is regarded "authentic" if this determined distance is within a predefined range. Thus, the security document becomes harder to counterfeit and the authenticity verification process becomes more reliable.

In another preferred embodiment, the method comprises a further step of determining a relative alignment of the security document with respect to the verification device, in particular by means of using an acquired image of the security document and by comparing an alignment dependent parameter (i.e., a feature of the to-be-verified security document, e.g., its width-to-height-ratio) of the security document in said acquired image to an expected alignment dependent parameter value (i.e., an expect value for the alignment dependent parameter for a given alignment, e.g., its expected width-to-height-ratio). Such a relative alignment can comprise

- a distance from the security document to the verification device,
- a tilt of the security document with respect to the verification device, and/or
- a rotation of the security document with respect to the verification device.

Thus, the positioning of the verification device with respect to the security document can be derived and the authenticity verification process becomes more reliable, e.g., because the relative alignment can be taken into account during the step of verifying the authenticity of the security document, e.g., via image correction algorithms. It should be noted here that additional information, e.g., from accelerometers or position sensors of the verification device can also be evaluated and taken into account.

As another aspect of the invention a verification device for verifying an authenticity of a security document comprises

- an image acquisition device such as a camera for acquiring a transmission mode image of at least a part of a perforation pattern of said security document.

The verification device furthermore comprises

- an analysis and control unit (e.g., a microprocessor with associated RAM/ROM memory and instruction code stored in this memory) adapted and structured to carry out the step of a method as described above.

As yet another aspect of the invention, a computer program element comprises computer program code means for, when executed by the analysis and control unit, implements an authenticity verification method as described above.

The described embodiments and/or features similarly pertain to the apparatuses, the methods, and the computer program element. Synergetic effects may arise from different combinations of these embodiments and/or features although they might not be described in detail.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

MODES FOR CARRYING OUT THE INVENTION

Figure 1:
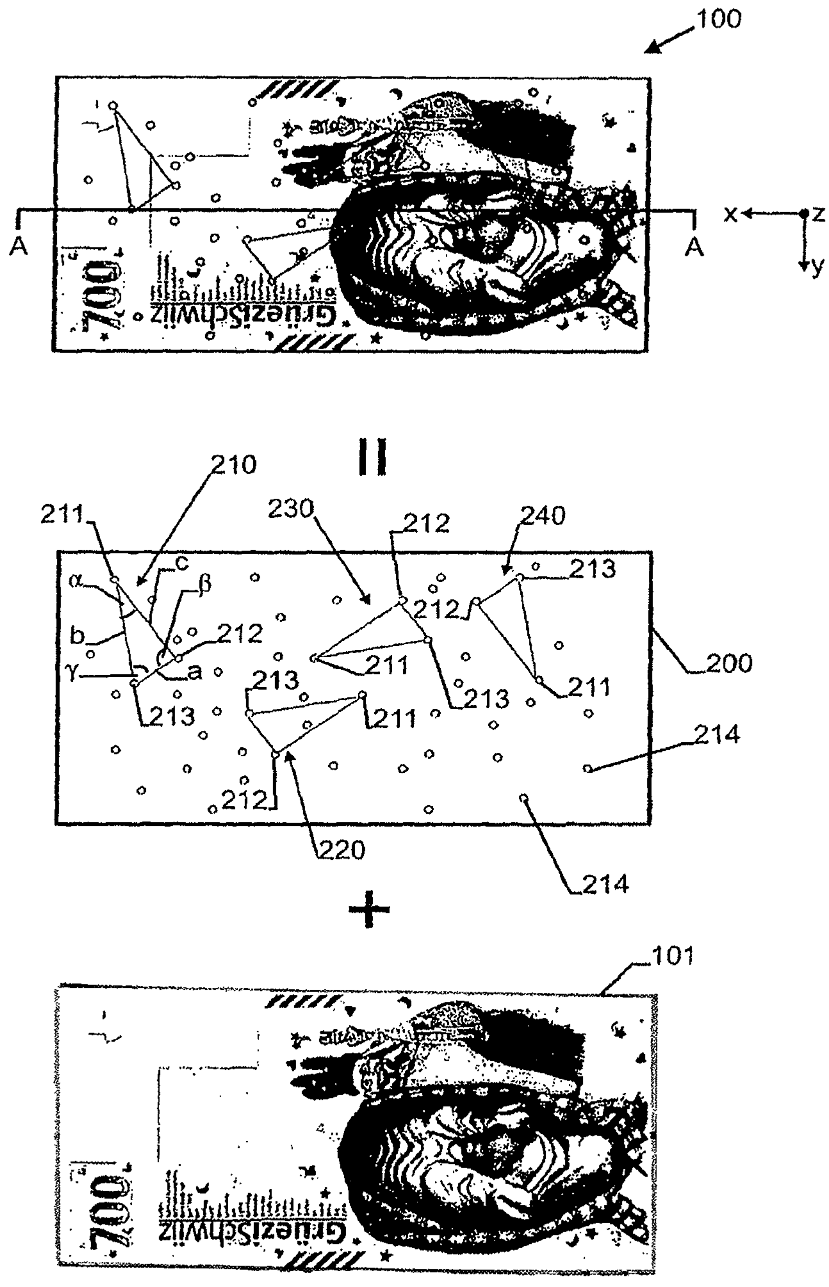
FIG. 1 shows a security document 100 comprising a printed security feature 101 on a flat substrate 200 with perforation patterns 210, 220, 230, and 240 each comprising three perforations 211, 212, 213 extending through the substrate 200.

Description of the Figures:

FIG. 1 shows a security document 100, i.e., a banknote 100, comprising a printed security feature 101 (shown in the bottom part of the figure) on a surface of a flat substrate 200. The flat substrate comprises two „ surfaces that are defined as the two opposing larger faces of the substrate that are perpendicular to the smaller lateral planes of the substrate. The security document 100 furthermore comprises four triangular shaped perforation patterns 210, 220, 230, and 240, each of them comprising three circular perforations 211, 212, 213 (i.e., the whole circles are perforated) extending axially (i.e., along an axis z which is perpendicular to the surfaces of the substrate) through the substrate 200. Here, the term "triangular shaped perforation pattern" relates to a perforation pattern 210, 220, 230, 240 with a perforation 211, 212, 213 arranged in each corner of an imaginary triangle. In other words, imaginary sides a, b, c of such an imaginary triangle connect the centers of the circular perforations 211, 212, and 213. The angle between the imaginary sides a and b is referred to as $\gamma$, the angle between the sides a and c is referred to as $\beta$, and the angle between the sides b and c is referred to as $\alpha$.

The circular perforations 211, 212, and 213 have lateral diameters of 100 μm and are thus not visible to the naked eye of a human observer in a reflection mode. In the described embodiment, all perforations 211, 212, and 213 have substantially the same shapes and substantially the same lateral dimensions (i.e., along axes x and y parallel to a surface of the substrate 200) and substantially the same axial dimensions (i.e., along z).

The perforation patterns 210, 220, 230, and 240 also have substantially the same shapes and overall dimensions, however, they are rotated and translated with respect to each other. Thus, the perforation patterns 210, 220, 230, and 240 are distributed over the substrate 200.

As it is also described later with respect to FIG. 2, to verify an authenticity of the security document 100, a transmission mode image of at least a part of the perforation patterns 210, 220, 230, and 240 is acquired by means of a verification device 500, e.g., a camera-equipped cellphone. In one embodiment, at least one perforation pattern 210, 220, 230 or 240 needs to be acquired in full to successfully verify the security documents authenticity. Then, the number and the shapes of the perforations 211, 212, and 213 in the acquired transmission mode image are compared to a perforation pattern template which is pre-stored in the verification device. In case of a positive match, the relative positioning of the perforations 211, 212, and 213 with respect to each other, specifically, the lengths of sides a, b, and c as well as the angles a, p, and y are determined and compared to the pre-stored master template. The security document 100 is considered "authentic" if the determined values and the stored values are within a threshold, e.g., not deviating more than ±5%. Suitable image feature recognition algorithms and/or other distinctive features for the above described steps are known to the person skilled in the art. Some examples are, e.g., also published in Lowe, D. G., "Distinctive Image Features from Scale-Invariant Keypoints", International Journal of Computer Vision, 60, 2, pp. 91-110, 2004, Suzuki, S. and Abe, K., "Topological Structural Analysis of Digitized Binary Images by Border Following", CVGIP 30 1, pp. 32-46, 1985, and/or http://en.wikipedia.org/wiki/Ramer-Douglas-Peucker_algorithm (as accessed on Sep. 5, 2012).

In addition to the perforations 211, 212, and 213, the security document 100 also comprises a randomly distributed plurality of perforations 214 (only two are referenced for clarity) which are not used in the step of verifying the authenticity of the security document 100. Thus, the distinctive features that are used for authenticity verification can be more easily hidden from a potential counterfeiter.

Figure 2:
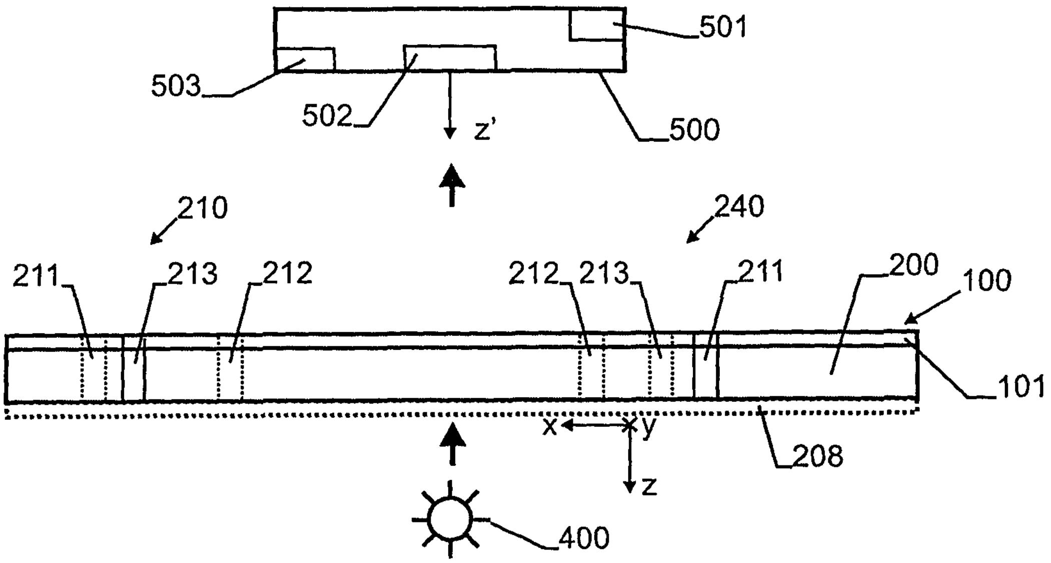
FIG. 2 shows a projection along −y of a sectional view along A-A of FIG. 1's security document 100 lo as well as a light source 400 and a verification device 500 with an analysis and control unit 501 and a camera 502 in a transmission setup.

FIG. 2 shows a projection along −y of a sects view along A-A of FIG. 1's security document 100. The substrate 200 can be laminated to an optional mounting substrate 208 (dotted) for stability. A light source 400 is arranged on one side of the security document 100 and a verification device 500 with an analysis and control unit 501 and with a camera 502 is arranged on an opposing side of the security document 100. Thus, a transmission mode image of the perforation patterns 210, 220, 230, and 240 can be more easily acquired by means of the verification device 500. Please note that only the perforation patterns 210 and 240 are shown for clarity and that sectioned perforations 213 and 211, respectively, are shown with solid lines whereas projected perforations 211, 212 and 212, 213, respectively, are shown with dotted lines. In addition to the transmission. mode image of the perforation patterns 210, 220, 230, 240, also a reflection mode image of the perforation patterns 210, 220, 230, 240 as well as of the printed security feature 101 is acquired by the verification device 500. For acquiring the reflection mode image, it is ensured that the illumination of the back-surface (first, surface, along +z) of the security document 100 originating from light source 400 is no longer outshining the illumination of the front-surface (second surface, along −z) of security document 100. For this, a flash 503 of the verification device 500 is fired during acquiring the reflection mode image but not during acquiring the transmission mode image. Then, both the reflection mode image and the transmission mode image are used for verifying the authenticity of the security document 100. Specifically, a relative positioning of the perforations 211, 212, 213 with respect to the printed security feature 101 is determined and compared to a master-template.

For making the authenticity verification procedure more robust against misalignment, a relative alignment of the security document 100 with respect to the verification device 500 is determined using the acquired images. Specifically, a rotation around z, a distance between the verification device 500 and the security document 100 along z, and an (undesired) tilt around x,y are determined and accounted for by means of image-processing algorithms before comparing the authenticity-related features to templates. Thus, the verification procedure becomes more reliable.

Figure 3:
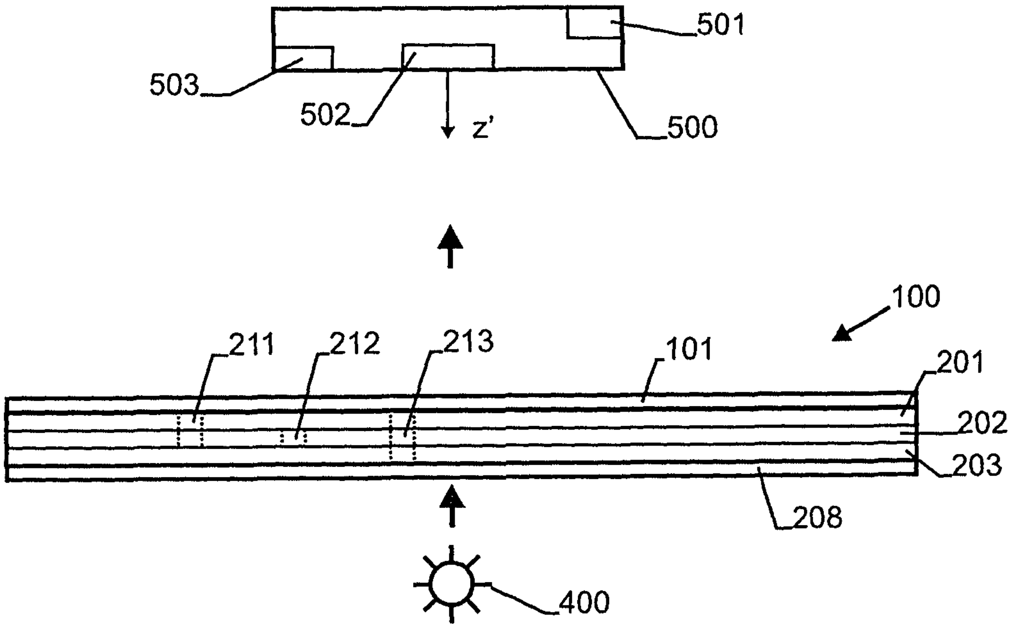
FIG. 3 shows a different embodiment of a security document 100 comprising a printed security feature 101 on a flat substrate 200 made of three layers 201, 202, and 203 with a perforation pattern 210 comprising three perforations 211, 212, 213 extending through different layers 201, 202, and/or 203 of the substrate 200.

FIG. 3 shows a very similar setup as FIG. 2 with a different embodiment of the security document 100. Specifically, the substrate 200 comprises three layers 201, 202, and 203 with different optical properties (e.g., colors, absorbances) and the perforations 211, 212, and 213 axially extend through different combinations of the layers 201, 202, and 203. Thus, in a transmission mode image, the perforations 211, 212, and 213 exhibit different optical properties (e.g., colors, brightnesses) which are used for verifying the authenticity of the security document 100. Thus, the security of the verification process can be improved.

Figure 4A:
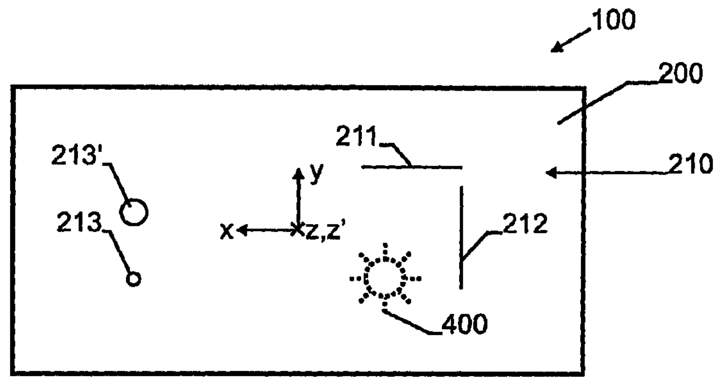
FIG. 4*a* shows a top view of a security document 100 comprising a perforation pattern 210 with two line-shaped perforations 211, 212, and with two additional perforations 213 and 213'.

FIG. 4*a* shows a top view of a security document 100 comprising a perforation pattern 210 with two line-shaped perforations 211, 212 and with two additional perforations 213, 213'. The perforations 211 and 212 have substantially the same perforation widths of 100 μm and lengths of 15 mm, but they exhibit different orientations, with respect to the substrate 200 of the security document 100. While the perforation 211 is oriented horizontally, i.e., along a first axis x, the perforation 212 is oriented vertically, i.e., along a second axis y. The perforation 213 is a round perforation with a diameter of 100 μm and the perforation 213' is a round perforation with a diameter of 700 μm. The perforations are not drawn to scale.

Figure 4B:
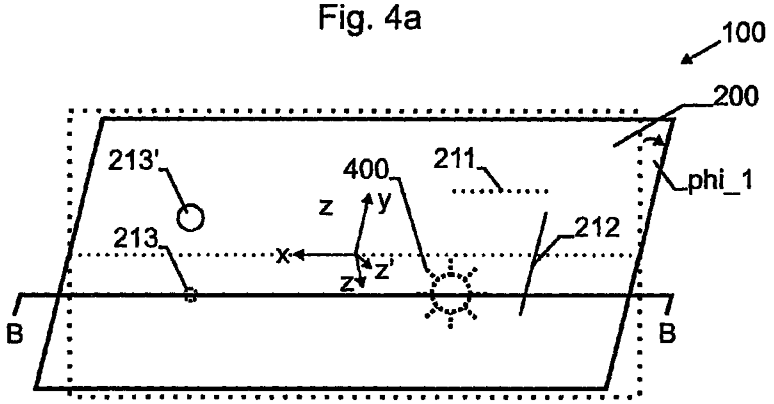
FIG. 4*b* shows a perspective view of the security document 100 of FIG. 4*a* under a first tilt angle phi_1 around an axis x.

FIG. 4*b* shows a perspective view of the security document 100 of FIG. 4*a* under a first tilt angle phi_1 around the first axis x. A light source 400 (dotted) is arranged behind the security document 100, i.e., on the +z side, while a verification device 500 (not shown for clarity) is arranged in front of the security document 100, i.e., on the −z side of the security document 100. In this embodiment, the step of acquiring a transmission mode image by means of the verification device 500 for authenticity verification of the security document 100 is carried out a non-zero tilt angle phi_1 of 15 degrees around the first axis x. In other words, the optical axis z' of the verification device 500 is tilted by phi_1 with respect to the third axis z of the tilted security document 100. The optical axis z' lies in a plane defined by the second axis y and the third axis z. Due to this tilting and the dimensioning and orientation of the perforations 211, 212, 213, and 213', only perforations 212 and 213' appear as a bright line and a bright spot (solid lines in the figure), respectively, in the transmission mode image whereas perforations 211 and 213 (dotted lines in the figure) remain substantially dark in transmission mode. Thus, a very specific tilt angle dependent security feature improves the security of the authenticity verification step.

Figure 4C:
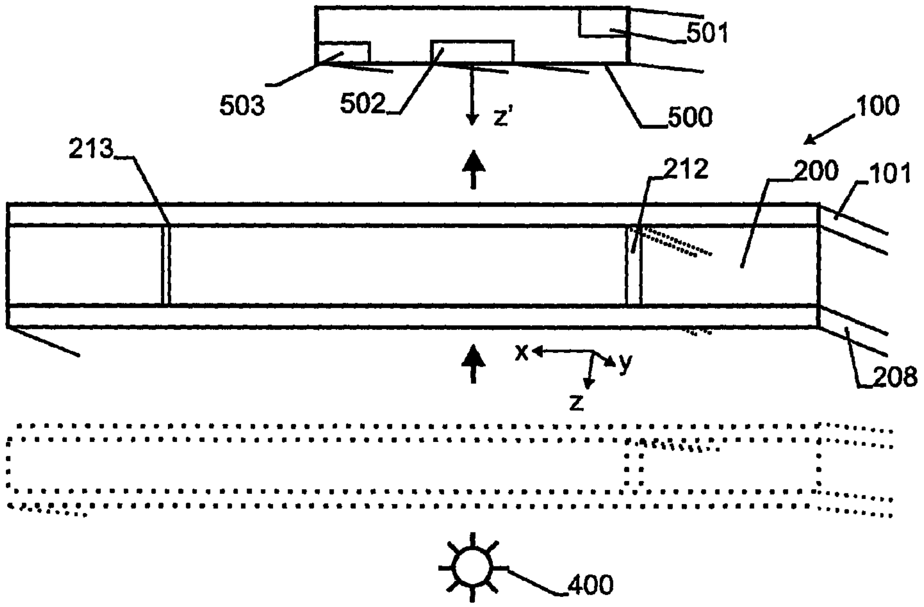
FIG. 4*c* shows a perspective sectional view along B-B of FIG. 4*b*.

FIG. 4*c* shows a perspective sectional view of the security document 100 of FIG. 4*b* along B-B. The original untilted positioning of the security document 100 as shown in FIG. 4*a* is shown in dotted lines for comparison.

Figure 4D:
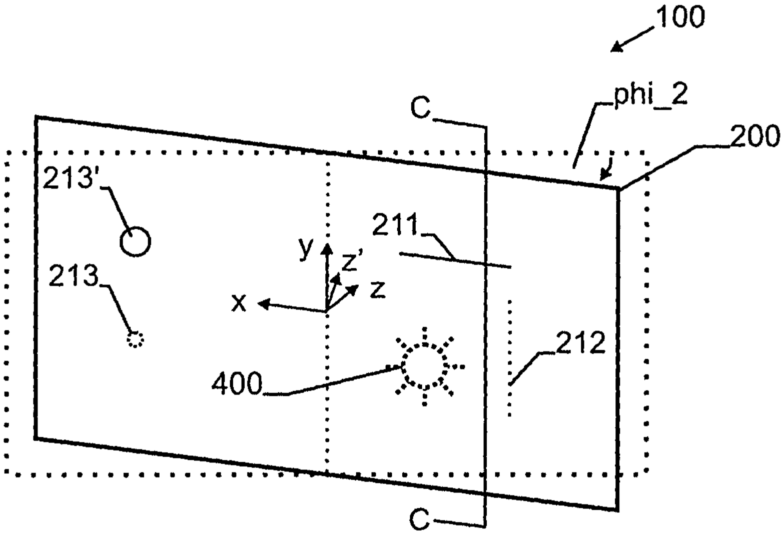
FIG. 4*d* shows a perspective view of the security document 100 of FIG. 4*a* under a second tilt angle phi_2 around an axis −y.

FIG. 4*d* shows a perspective view of the security document 100 of FIG. 4*a* under a second tilt angle phi_2 around an axis −y. This description above with regard to FIG. 4*b* similarly pertains to FIG. 4*d* with the difference that this time, due to the tilting around the second axis y and the dimensioning and orientation of the perforations 211, 212, 213, and 213', only perforations 211 and 213' appear as a bright line and a bright spot (solid lines in the figure), respectively, in the transmission mode image whereas perforations 212 and 213 (dotted lines in the figure) remain substantially dark.

Figure 4E:
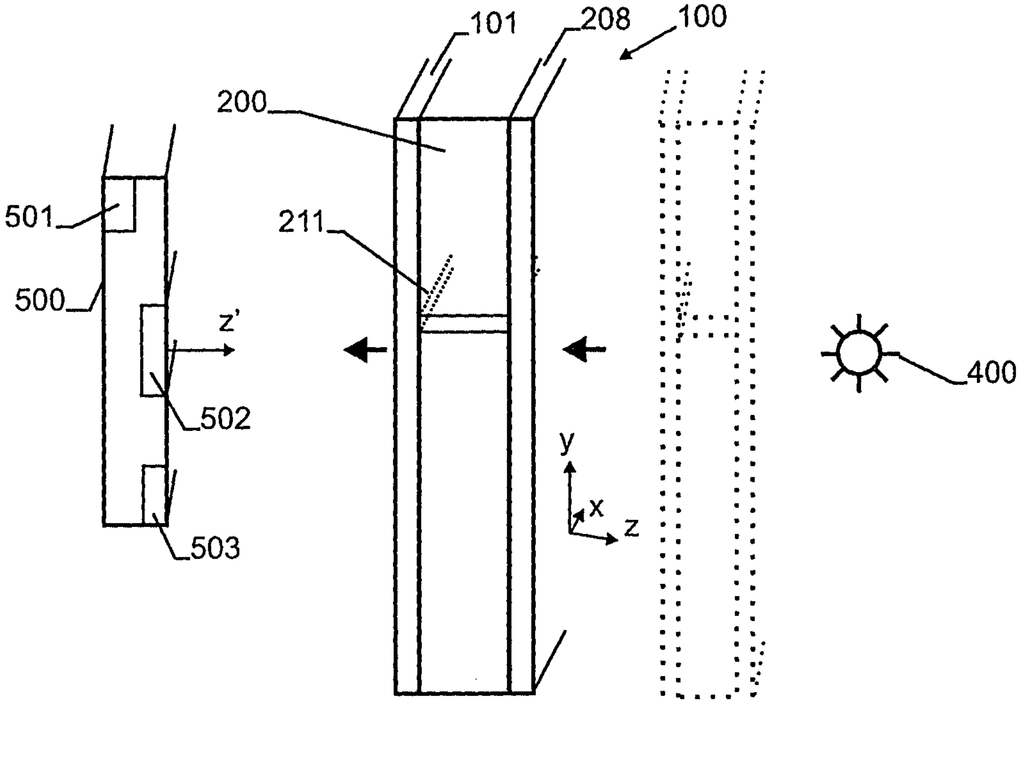
FIG. 4*e* shows a perspective sectional view along C-C of FIG. 4*d*, FIGS. 5*a*, 5*b*, and 5*c* show three differently shaped perforations 215, 215', and 215"

FIG. 4*e* shows a perspective sectional view of the security document 100 of FIG. 4*d* along C-C. The original untilted positioning of the security document 100 as shown in FIG. 4*a* is shown in dotted lines for comparison.

An acquisition of two transmission mode images, one image under a tilt angle phi_1 as described above with regard to FIGS. 4*b* and 4*c* and another additional transmission mode image under a tilt angle phi_2 as described above with regard to FIGS. 4*d* and 4*e* further improves the security of the authenticity verification step.

Figure 5A:
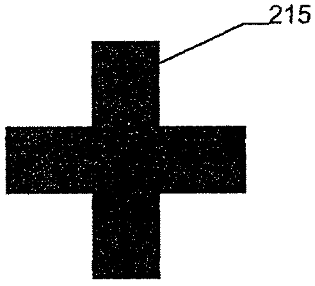
Figure 5B:
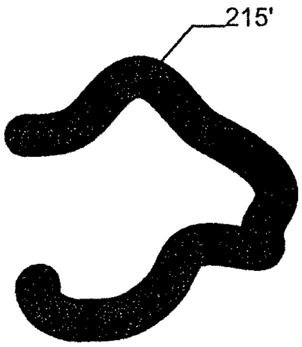
Figure 5C:
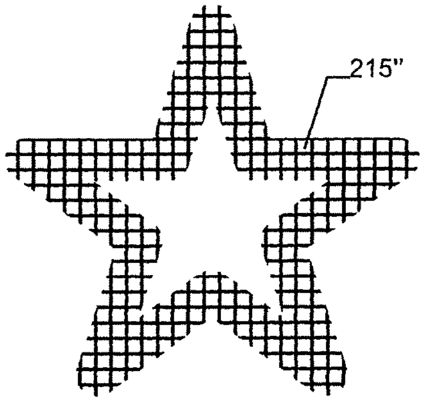

FIGS. 5*a*, 5*b*, and 5*c* show three differently shaped perforations 215, 215', and 215". Specifically, perforation 215 of FIG. 5*a* is substantially "Swiss-Cross"-shaped and has total up-to-down and left-to-right elongations (as observed in the figure in a normal reading position) of 800 microns with a vertical diameter of the horizontal bar of 300 microns. FIG. 5*b* shows a free-line perforation 215' with a line diameter of 200 microns. FIG. 5*c* shows a star-shaped perforation 215" with a total line dimension of 700 microns. Unlike in the perforations 215 and 215' of FIGS. 5*a* and 5*b*, not the whole interior part (i.e., "line width") of perforation 215" is perforated but here, it is rastered by a quadratic line pattern (black lines) with perforated line widths of 50 microns. With such a perforation, an unperforated mounting substrate 208 can be used for stability (not shown). Such very specific perforations that can be tilt angle dependent improve the security of the authenticity verification step.

Figure 6:
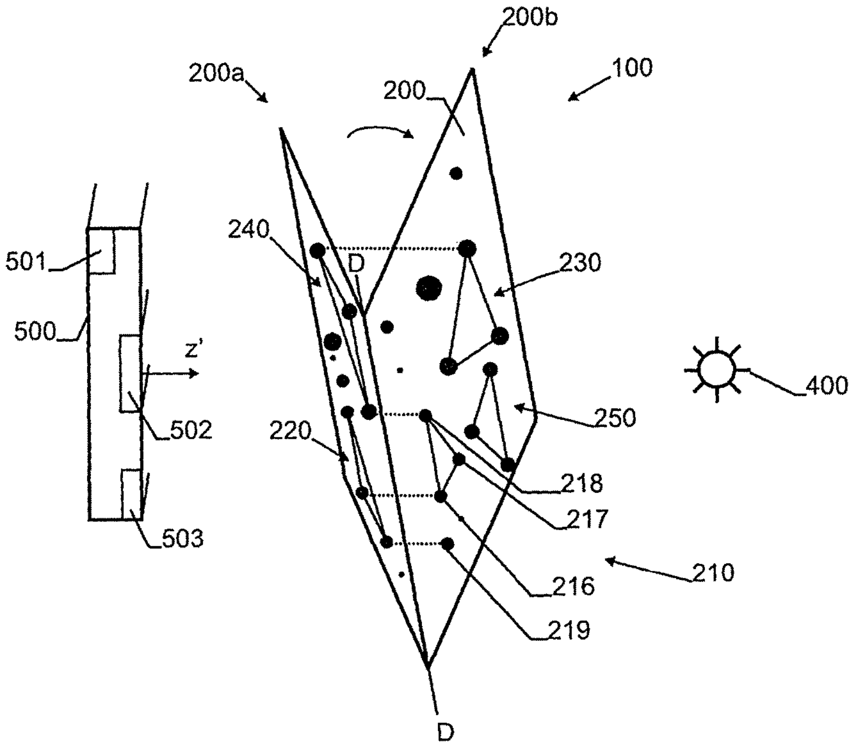
FIG. 6 shows a different embodiment of a security document 100 comprising a flat substrate 200 which is foldable along a line D-D with perforation patterns 210, 220, 230, and 240 each comprising three perforations 216, 217, 218 extending through the substrate 200.

FIG. 6 shows a different embodiment of a security document 100 comprising a flat substrate 200 which is partly folded along a line D-D. The line D-D is arranged such that the substrate 200 is divided into two parts 200*a* and 200*b*. Perforation patterns 210, 220, 230, 240, and 250 comprising three perforations each are arranged at different locations in said substrate. Furthermore, additional perforations 219 are arranged in the substrate 200. To verify the authenticity of this embodiment of the security document 100, a transmission mode image is acquired by means of the verification device 500 in a fully folded position of the substrate 200 along line D-D (curved arrow), i.e., such that the two folded parts 200*a* and 200*b* of the substrate touch each other. Thus, some of the perforations (dotted lines) axially (i.e., along z') coincide with each other and light from the light source 400 is transmitted through the coinciding perforations. By folding the substrate 200 and acquiring a transmission mode image, the original "starry sky pattern" of the perforations of the original security document is thinned in a way that a smaller number of bright regions appear in a transmission mode image, i.e., only axially coinciding perforations. Thus, the security of the authenticity verification step is improved.

As another option, it would also be possible to align a stencil with perforations or one or more other security documents with specific perforation patterns with the first security document to thin the "starry sky pattern" of the first security document.

Note:

It should be noted that it is also possible to use shadowing effects to further enhance the security of the authenticity verification step. Specifically, the light distribution from the light source illuminating the first surface of the substrate for acquiring the transmission mode image can be spatially modulated and comprise dark regions. If such a dark region coincides with a perforation, this perforation would appear as a dark spot in the transmission mode image. Then, the contrast of this dark spot compared to the surrounding brighter region of the substrate could be detected and used for is authenticity verification.

While there are shown and described presently preferred embodiments of the invention, it is to be distinctly understood that the invention is not limited thereto but may be otherwise variously embodied and practiced within the scope of the following claims.

The invention claimed is:

1. A method for verifying an authenticity of a security document, wherein said security document comprises a substrate, at least one perforation pattern in said substrate, and a security feature on said substrate, wherein said perforation pattern comprises a plurality of perforations of at least a part of said substrate, wherein to the naked eye of a human observer at least one of said perforations is not visible in a reflection mode, and wherein the method comprises steps of acquiring a transmission mode image of at least a part of said perforation pattern of said security document by means of a verification device, acquiring a reflection mode image of at least a part of said perforation pattern of said security document by means of said verification device, acquiring a reflection mode image and/or a transmission mode image of said security feature of said security document by means of said verification device, determining a relative positioning of at least one of said perforations with respect to said security feature, and verifying by means of said verification device said authenticity of said security document using said transmission mode image of at least said part of said perforation pattern, said reflection mode image of at least said part of said perforation pattern, said reflection mode image and/or said transmission mode image of said security feature, and said determined relative positioning.

2. The method of claim 1, wherein said verification device is selected from a group consisting of a camera-equipped cellular phone, a camera-equipped tablet computer, a digital camera, a camera-equipped laptop computer, a bank note sorter, and a bank note acceptor.

3. The method of claim 1, wherein at least one of said perforations of said substrate has a lateral dimension less than 200 microns in at least one direction parallel to a surface of said substrate.

4. The method of claim 1, wherein said perforations have different shapes and/or different lateral dimensions parallel to a surface of said substrate and/or different axial dimensions perpendicular to a surface of said substrate.

5. The method of claim 1, wherein all perforations have substantially the same shapes and the same lateral dimensions parallel to a surface of said substrate and the same axial dimensions perpendicular to a surface of said substrate.

6. The method of claim 1, wherein the security document comprises at least a first perforation pattern and a second perforation pattern, each perforation pattern comprising a plurality of perforations of said substrate, wherein said second perforation pattern is translated and/or rotated and/or mirrored and/or scaled with respect to said first perforation pattern.

7. The method of claim 1, wherein a first lateral dimension along a first axis parallel to a surface of said substrate of at least one of said perforations is different from a second lateral dimension along a second axis parallel to said surface of said substrate of said at least one of said perforations, and wherein said step of acquiring said transmission mode image is carried out at a non-zero tilt angle between an optical axis of said verification device and a third axis perpendicular to said surface of said substrate.

8. The method of claim 7, wherein said tilt angle is greater than 10 degrees.

9. The method of claim 7, wherein said optical axis of said verification device substantially lies in a plane defined by said first axis and said third axis or in a plane defined by said second axis and said third axis.

10. The method of claim 7, wherein said step of acquiring said transmission mode image is carried out at a first tilt angle and wherein a further step of acquiring an additional transmission mode image is carried out at a second tilt angle different from said first tilt angle, and wherein said transmission mode image and said additional transmission mode image are used in said step of verifying said authenticity of said security document.

11. The method of claim 7, wherein said tilt angle is greater than 30 degrees.

12. The method of claim 7, wherein said tilt angle is greater than 45 degrees.

13. The method of claim 1, wherein said perforation pattern is self-similar.

14. The method of claim 1, wherein said step of acquiring said reflection mode image comprises a change of an illumination of said security document.

15. The method of claim 14, wherein the change of the illumination of said security document is done by means of a firing of a flash of said verification device.

16. The method of claim 1, wherein a shape of at least one of said perforations, and/or a lateral dimension parallel to a surface of said substrate of at least one of said perforations, and/or a transmitted light intensity and/or wavelength through at least one of said perforations, and/or a number of perforations, and/or an absolute and/or a relative positioning of at least one of said perforations, and/or at least one angle between two connecting lines between three perforations is or are used in said step of verifying said authenticity of said security document.

17. The method of claim 1, wherein said security document additionally comprises at least one perforation which is not used in said step of verifying said authenticity of said security document.

18. The method of claim 1, wherein said security feature is a printed security feature on said substrate.

19. The method of claim 1, comprising a further step of determining a relative alignment of said security document with respect to said verification device, in particular by means of using an acquired image of said security document and by comparing an alignment dependent parameter of said security document in said acquired image to an expected alignment dependent parameter.

20. A verification device for verifying an authenticity of a security document comprising:

a camera for acquiring a transmission mode image of at least a part of a perforation pattern of said security document and an analysis and control unit adapted and structured to carry out the step of a method of claim 1.

21. The method of claim 1, wherein at least one of said perforations of said substrate has a lateral dimension less than 150 microns in at least one direction parallel to a surface of said substrate.

22. The method of claim 1, wherein at least one of said perforations of said substrate has a lateral dimension less than 100 microns, in at least one direction parallel to a surface of said substrate.

23. A non-transitory computer-readable medium comprising computer program code that when executed by one or more processors, causes the one or more processors to:

acquire by means of a verification device a transmission mode image of at least a part of a perforation pattern in a substrate of a security document, wherein said perforation pattern comprises a plurality of perforations of at least a part of said substrate of said security document, wherein to the naked eye of a human observer at least one of said perforations is not visible in a reflection mode, acquire by means of said verification device a reflection mode image of at least a part of said perforation pattern of said security document, acquire by means of said verification device a reflection mode image and/or a transmission mode image of a security feature of said security document, determine a relative positioning of at least one of said perforations with respect to said security feature, and verify an authenticity of said security document using said transmission mode image of at least said part of said perforation pattern, said reflection mode image of at least said part of said perforation pattern, said reflection mode image and/or said transmission mode image of said security feature, and said determined relative positioning.

* * * * *